(12) United States Patent
Golitschek Edler von Elbwart et al.

(10) Patent No.: US 10,904,912 B2
(45) Date of Patent: Jan. 26, 2021

(54) METHOD AND APPARATUS FOR COMMUNICATING A TRANSPORT BLOCK IN AN UNLICENSED UPLINK TRANSMISSION ON A WIRELESS NETWORK

(71) Applicant: Lenovo (Singapore) Pte. Ltd., New Tech Park (SG)

(72) Inventors: Alexander Johann Maria Golitschek Edler von Elbwart, Darmstadt (DE); Robert T. Love, Barrington, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 9 days.

(21) Appl. No.: 16/362,680

(22) Filed: Mar. 24, 2019

(65) Prior Publication Data
US 2019/0306876 A1  Oct. 3, 2019

Related U.S. Application Data

(60) Provisional application No. 62/651,079, filed on Mar. 31, 2018.

(51) Int. Cl.
*H04B 7/00* (2006.01)
*H04W 72/12* (2009.01)
(Continued)

(52) U.S. Cl.
CPC ....... *H04W 72/1289* (2013.01); *H04L 1/0009* (2013.01); *H04L 1/0031* (2013.01); *H04L 1/1864* (2013.01); *H04L 5/0044* (2013.01); *H04L 5/0053* (2013.01); *H04L 5/0055* (2013.01); *H04L 27/0006* (2013.01); *H04W 28/06* (2013.01); *H04W 72/042* (2013.01);
(Continued)

(58) Field of Classification Search
CPC ........... H04W 72/042; H04W 72/0446; H04W 72/1263; H04W 72/1278; H04W 72/1289
USPC ........................................ 370/310, 328, 329
See application file for complete search history.

(56) References Cited

U.S. PATENT DOCUMENTS 10,285,167 B2 * 5/2019 Chen .................... H04L 5/0053
10,547,410 B2 * 1/2020 Einhaus ............... H04L 1/0068
(Continued)

FOREIGN PATENT DOCUMENTS

WO     20150042396 A1    3/2015

OTHER PUBLICATIONS

Courville, PCT International Search Report, International Application No. PCT/IB2019/052638, European Patent Office, Rijswijk, NL, dated Jul. 7, 2019.
(Continued)

*Primary Examiner* — Dmitry Levitan
(74) *Attorney, Agent, or Firm* — Loppnow & Chapa; Matthew C. Loppnow

(57) ABSTRACT

A method and apparatus communicate a transport block in an unlicensed uplink transmission on a wireless network. Downlink Control Information (DCI) can be received on a control channel. The DCI can schedule an unlicensed uplink (UL) transmission for a UE. The DCI can include a field that indicates whether the UE should apply a scaling factor when determining a Transport Block Size (TBS). A transport block can be transmitted in the unlicensed UL transmission based on the received DCI.

15 Claims, 5 Drawing Sheets

(51) Int. Cl.
  *H04W 72/04* (2009.01)
  *H04W 28/06* (2009.01)
  *H04L 5/00* (2006.01)
  *H04L 1/18* (2006.01)
  *H04L 1/00* (2006.01)
  *H04L 27/00* (2006.01)

(52) U.S. Cl.
  CPC ... *H04W 72/0446* (2013.01); *H04W 72/1268* (2013.01)

(56) References Cited

U.S. PATENT DOCUMENTS

| | | | |
|---|---|---|---|
| 10,581,570 B2* | 3/2020 | Baker | H04L 5/0053 |
| 2019/0037538 A1* | 1/2019 | Jiang | H04W 72/04 |
| 2019/0306876 A1* | 10/2019 | Golitschek Edler von Elbwart | H04W 72/0446 |
| 2019/0387412 A1* | 12/2019 | Kim | H04W 56/001 |
| 2020/0022218 A1* | 1/2020 | Chang | H04W 16/26 |
| 2020/0067676 A1* | 2/2020 | Yi | H04W 72/04 |

OTHER PUBLICATIONS

LG Electronics: "Discussion on resource allocation and TBS determination", 3GPP Draft; R1-1717965 Discussion on Resource Allocation and TBS Determination VF, 3rd Generation Partnership Project (3GPP), Mobile Competence Centre; 650, Route Des Lucioles ; F-06921 Sophia-Antipo vol. RAN WG1, No. Prague, CZ; Oct. 9, 2017-Oct. 13, 2017, Oct. 3, 2017 (Oct. 3, 2017).

Texas Instruments: "Problems with DCI Format 1A and 2 for Retransmission", 3GPP Draft; R1-083520 TI DCI1A2, 3rd Generation Partnership Project (3GPP), Mobile Competence Centre; 650, Route Des Lucioles ; F-06921 Sophia-Antipolis Cedex ; France, No. Prague, Czech Republic; Sep. 24, 2008, Sep. 24, 2008 (Sep. 24, 2008).

* cited by examiner

METHOD AND APPARATUS FOR COMMUNICATING A TRANSPORT BLOCK IN AN UNLICENSED UPLINK TRANSMISSION ON A WIRELESS NETWORK

BACKGROUND

1. Field

The present disclosure is directed to a method and apparatus for communicating a transport block in an unlicensed uplink transmission on a wireless network.

2. Introduction

Presently, wireless communication devices, such as User Equipments (UEs), communicate with other communication devices using wireless signals. Prior to 3rd Generation Partnership Project (3GPP) Long Term Evolution (LTE) Release 15, a UE is allowed to transmit only full subframes, with potential starting positions at symbol {#7, #7+25 μs, #7+25 μs+TA, #8}, where 'TA' is the applicable timing advance offset used for uplink transmissions. For convenience, this is called partial Uplink (UL) subframe Mode 0 in the context of the present disclosure.

For uplink transmissions on an unlicensed carrier, LTE Release 15 has adopted the potential of the following partial subframes in addition to the full subframes of partial UL subframe Mode 0: partial UL subframe Mode 1 where the UE may start at a Release (Rep-14 starting point, such as symbol #0, or at symbol #7 depending on, for example, the outcome of Listen Before Talk (LBT); partial UL subframe Mode 2, where the UL grant indicates the starting position at number #7; and partial UL subframe Mode 3, where the UL grant indicates the ending position in the end of symbol #3 or #6. However, there has not been any provision for appropriately indicating whether a UE should apply a scaling factor when determining a Transport Block Size (TBS) of a transport block in an unlicensed UL transmission.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

At least some embodiments provide a method and apparatus for communicating a transport block in an unlicensed uplink transmission on a wireless network. At least some embodiments can also provide for transport block size determination using scaling for partial subframes.

According to a possible embodiment, Downlink Control Information (DCI) can be received on a control channel. The DCI can schedule an unlicensed UL transmission for a UE. The DCI can include a field that indicates whether the UE should apply a scaling factor when determining a TBS. A transport block can be transmitted in the unlicensed UL transmission based on the received DCI.

Figure 1:
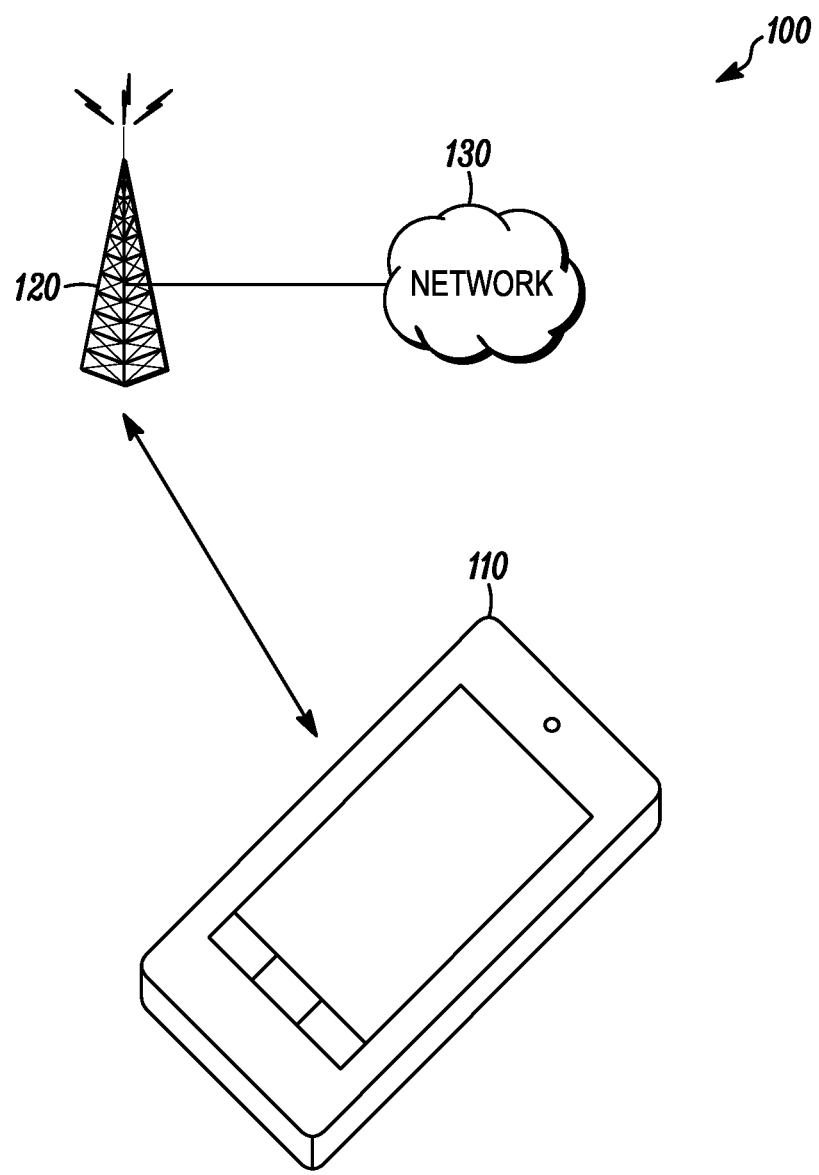
FIG. 1 is an example block diagram of a system according to a possible embodiment.

According to another possible embodiment, DCI can be sent on a control channel. The DCI can schedule an unlicensed UL transmission to a UE. The DCI can include a field that indicates whether the UE should apply a scaling factor when determining a TBS. The unlicensed UL transmission can be received from the UE. The unlicensed UL transmission can be based on the DCI FIG. 1 is an example block diagram of a system 100 according to a possible embodiment. The system 100 can include at least one wireless communication device 110, such as a UE, at least one network entity 120, such as an enhanced NodeB (eNB), base station, transmission and reception point, and/or other wireless communication device, and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

In order to facilitate a good spectral efficiency and at the same time a limited complexity for transport block generation, some mechanisms can determine the TBS differently for partial subframes than for full subframes. Mechanisms can also determine the downlink TBS when partial DL subframes can occur. This can be, for example, the Downlink Pilot Time Slot (DwPTS) part in a Time Division Duplexing (TDD), such as frame structure 2, special subframe, or partial Downlink (DL) subframes on an unlicensed carrier, such as frame structure 3.

So far, an agreement for the new UL partial subframes is to not employ any TBS modification for partial UL subframe Mode 1, and to adapt the TBS in case of partial UL subframe Mode 2 and partial UL subframe Mode 3 by a mechanism called TBS scaling. For TBS scaling, for partial UL subframe Mode 1, the UE may start at a Rel-14 starting point, such as symbol #0, or at symbol #7 depending on, for example, the outcome of LBT. The TBS can be determined as for the full subframe regardless of the starting point, such as with no TBS scaling. For partial UL subframe Mode 2, the UL grant can indicate starting position at number #7. The TBS of the Mode 2 partial UL subframe can be scaled by a factor of 0.5. For partial UL subframe Mode 3, the UL grant can indicate ending position in the end of symbol #3 or #6, the TBS of a subframe ending at symbol #6 can be determined by applying a scaling factor of 0.5, and the TBS of a subframe ending at symbol #3 can be determined by applying a scaling factor of 0.125.

Not modifying the TBS for partial UL subframe Mode 1 can provide limited complexity in the transport block generation. Since all transmissions may occur on an unlicensed carrier, generally the UE may need to carry out a Clear Channel Assessment (CCA), such as LBT, before it is allowed to transmit on the medium. However, from a timeline perspective, Medium Access Control (MAC) or similar communication layers advantageously generate a transport block before the result of the CCA is known, such as whether the CCA succeeds at the subframe boundary so that a full subframe is available for transmission or whether the CCA succeeds at the slot boundary prior to symbol #7 so that only half a subframe is available for transmission.

However, for partial UL subframe Mode 2, the UE may only try to access the channel just before symbol #7. The only two possible results can be where CCA succeeds and the transmission uses begins at symbol #7 or where CCA fails and no transmission is performed. In the second case, the UE may perform CCA again at a later time.

Therefore, there is no uncertainty on the number of available resources when CCA succeeds. Consequently, it has been agreed that for partial UL subframe Mode 2, the UE can apply a scaling factor of 0.5 to the number of assigned resource blocks when determining the TBS, as compared to Technical Specification (TS) 36.213 Version (V)15.0.0, clause 8.6.2: "set the Table 7.1.7.2.1-1 column indicator to $max\{\lfloor N_{PRB} \times 0.125 \rfloor, 1\}$ instead of $N_{PRB}$", which would be adapted to "set the Table 7.1.7.2.1-1 column indicator to $max\{\lfloor L_{PRB} \times 0.5 \rfloor, 1\}$ instead of $N_{PRB}$" in this case. Similar as for partial UL subframe Mode 2, for partial UL subframe Mode 3 the UE can apply a scaling factor of 0.125 to the number of assigned resource blocks when determining the TBS.

The drawback of the scaling solution for partial UL subframe Mode 2 and partial UL subframe Mode 3 can appear when a transport block requires Hybrid Automatic Repeat Request (HARQ) retransmissions. In general, for low latency and efficiency, it can be useful that a transport block that has been generated for a partial UL subframe Mode 2/3 subframe can be retransmitted in any other subframe, regardless of partial UL subframe Mode 0/1/2/3, and likewise that a transport block that has been generated for a partial UL subframe Mode 0/1 can be retransmitted in any other subframe, regardless of partial UL subframe Mode 0/1/2/3. This implies that the TBS generation for the different partial UL subframe Modes should be able to result in as many identical TBSs as possible, but the number of identical TBSs between the scaling solutions for partial UL subframe Mode 2/3 and the TBS obtained for partial UL subframe Mode 0/1 can be limited, as shown later in this disclosure.

For DL partial subframes, in case of transmissions in DwPTS of a frame structure 2 special subframe, or in a partial ending DL subframe on an unlicensed cell, such as frame structure 3, the TBS can be determined according to the following rule, which is from Clause 7.1.7 in TS 36.213 V15.0.0: If the transport block is transmitted in DwPTS of the special subframe in frame structure type 2, or is transmitted in the subframes with the same duration as the DwPTS duration of a special subframe configuration in frame structure type 3, then for special subframe configuration 9 and 10 with normal cyclic prefix or special subframe configuration 7 with extended cyclic prefix, set the Table 7.1.7.2.1-1 column indicator $$N_{PRB} = max\{\lfloor N'_{PRB} \times 0.375 \rfloor, 1\}$$

and for other special subframe configurations, set the Table 7.1.7.2.1-1 column indicator $$N_{PRB} = max\{\lfloor N'_{PRB} \times 0.75 \rfloor, 1\}.$$

Overall, the proposals commonly facilitate retransmissions of a transport block in a subframe regardless which of partial UL subframe Mode 0/1/2/3 applies to the subframe of the retransmission. For example, they may address the limitations to the available TBS that can be indicated for a retransmission of a transport block in a subframe that would apply a different scaling factor than used for the subframe of the first transmission of the transport block. This may facilitate a simple scheduler design and keep the latency small between the first transmission and a retransmission of a transport block. This may also apply to the case of DL partial subframes employing a scaling factor when determining the TBS.

According to a first possible embodiment, if the UE is allowed to transmit using two or more of partial UL subframe Mode 0/1/2/3, the DCI format scheduling unlicensed UL transmission to a UE can include a field that indicates whether the UE should apply a scaling factor when determining the TBS. The scaling can be applied for the TBS determination for a retransmission of a transport block if and only if scaling is applied for the TBS determination for a first transmission of the transport block, and the scaling may not be applied for the TBS determination for a retransmission of a transport block if and only if scaling is not applied for the TBS determination for a first transmission of the transport block. In case there is a choice of a plurality of scaling factors other than 1.0, such as no scaling, the same scaling factor can be applied to the TBS determination for a retransmission as to the TBS determination for a first transmission of a transport block. To this end, in an implementation of the first embodiment, the field included in the DCI can indicate not just whether a scaling factor should be applied, but can also indicate the value of the scaling factor to be applied. For example, the field may indicate either a scaling factor of 1.0, such as no scaling, 0.5, or 0.125.

According to a second embodiment, the UE can apply the defined scaling value according to partial UL subframe Mode 0/1/2/3 if the subframe is used to transmit a first transmission of a transport block. If the same transport block is retransmitted in another subframe, the UE can apply the scaling value that was used for the first transmission of the transport block to determine the TBS for the subframe. For example, the UE can ignore the partial UL subframe Mode 0/1/2/3 applicable to the subframe carrying the retransmission regarding the TBS determination.

In a first variant of the second embodiment, the UE can determine whether a first transmission or a retransmission of a transport block is used by comparing a New Data Indicator (NDI) value indicated in the DCI, where an NDI that is toggled with respect to the most recent NDI for the same HARQ process indicates a first transmission and an untoggled NDI indicates a retransmission. In this variant, no additional signalling in DCI may be necessary. However, the DCI may be missed by the UE and there may be no understanding between base station and UE about the toggling status, which may lead to TBS determination errors. To avoid the potential misunderstanding about the toggling status, in a second variant of the second embodiment the DCI can include an indication that indicates whether it is scheduling a first transmission or a retransmission of a transport block.

In a third variant of the second embodiment, the DCI can include a retransmission counter, such as a field that indicates the ordinal number of the (re)transmission that is scheduled by the DCI. For example, if the retransmission counter field consists of two bits, then '00' can indicate a first transmission of a transport block, '01' can indicate the first retransmission of the transport block, '10' can indicate the second retransmission of the transport block, '11' can indicate the third or higher retransmission of the transport block. In this context, any retransmission indication, such as any value but '00' in this example, can imply that the UE should follow the described behaviour for the second embodiment. For example, the UE can apply the scaling value that was used for the first transmission of the transport block to determine the TBS for the subframe.

In a fourth variant of the second embodiment, to overcome a misunderstanding about the toggling status, the UE can include an indicator that can indicate whether it applies a scaling factor for the TBS determination for the corresponding uplink transmission. In an enhancement of this variant of the second embodiment, the UE can include an indicator to indicate the value of the scaling factor for the TBS determination for the corresponding uplink transmission.

According to a third embodiment, if the UE can receive partial DL subframes, the DCI format scheduling the DL transmission to the UE can include a field that can indicate whether a scaling factor is applied when determining the TBS. The scaling for the TBS determination for a retransmission of a transport block may be applied if and only if scaling is applied for the TBS determination for a first transmission of the transport block, and the scaling for the TBS determination for a retransmission of a transport block may not be applied if and only if scaling is not applied for the TBS determination for a first transmission of the transport block. In case there is a choice of pluralities of scaling factors other than 1.0, such as no scaling, the same scaling factor can be applied to the TBS determination for a retransmission as the TBS determination for a first transmission of a transport block. To this end, in an implementation of the third embodiment, the field included in the DCI can indicate not just whether a scaling factor is applied, but also can indicate the value of the scaling factor to be applied. For example, the field may indicate a scaling factor of 1.0, such as no scaling, a scaling factor of 0.5, or a scaling factor of 0.125.

According to a fourth embodiment, the UE can apply the defined scaling value according to the partial DL subframe length if the subframe is used to transmit a first transmission of a transport block. If the same transport block is retransmitted in another subframe, the UE can apply the scaling value that was used for the first transmission of the transport block to determine the TBS for the subframe. For example, the UE can ignore the partial DL subframe length applicable to the subframe carrying the retransmission regarding the TBS determination. The partial DL subframe length can be known from the special subframe configuration or another indication received such as the configuration of occupied OFDM symbols for an unlicensed cell.

In one variant of the fourth embodiment, the UE can determine whether a first transmission or a retransmission of a transport block is used by comparing the NDI value indicated in the DCI with respect to a most recent NDI for the same HARQ process, where an NDI that is toggled with respect to the most recent NDI can indicate a first transmission and an untoggled NDI can indicate a retransmission. In this variant, no additional signalling in DCI may be necessary. However, the DCI could be missed by the UE and there may be no understanding between base station and UE about the toggling status, which may lead to TBS determination errors. To avoid this potential misunderstanding about the toggling status, in a second variant of the fourth embodiment the DCI can include an indication that indicates whether it is scheduling a first transmission or a retransmission of a transport block.

Similar to the third variant of the second embodiment discussed above, in a third variant of the fourth embodiment, the DCI can include a retransmission counter, such as a field that can indicate an ordinal number of the (re)transmission that is scheduled by the DCI. For example, if the retransmission counter field has two bits, then '00' can indicate a first transmission of a transport block, '01' can indicate the first retransmission of the transport block, '10' can indicate the second retransmission of the transport block, and '11' can indicate the third or higher retransmission of the transport block. In this context, any retransmission indication, for example, any value but '00', can imply that the UE should follow the described behaviour for the fourth embodiment. For example, the UE can apply the scaling value that was used for the first transmission of the transport block to determine the TBS for the subframe.

Alternatively, the scaling formula can be modified from the currently specified formula to create more identical TBSs between TBS determined without scaling and TBS determined with scaling. For example, for UL transmissions on an unlicensed carrier, the resource allocation granularity can be much more limited compared to UL transmissions on a licensed carrier. Resources in the frequency domain on an unlicensed carrier may only be assigned in multiples of 10 resource blocks. As a consequence, if, for example, a scaling factor of 0.125 is applied when 90 resource blocks are assigned, the TBS can be obtained according to an assignment of max{floor(90*0.125), 1}=11 resource blocks. As this is not a multiple of 10, if a retransmission for such a generated transport block occurs later in a subframe without scaling, no good overlap of resulting TBSs may be observed. On the other hand, the situation can be different if the scaling occurred such that the result of using scaling is compatible with the result without scaling or with a different scaling factor. Therefore, in a fifth embodiment, the resulting number of resource blocks for determining the TBS with scaling can be a number of resource blocks that can be scheduled without scaling or when a different scaling factor is applied. When applied to uplink transmissions on an unlicensed carrier, the scaling formula can therefore be modified to $$N_{PRB} = 10 \times \max\left\{\left\lfloor N'_{PRB} \times \frac{0.5}{10} \right\rfloor, 1\right\} \text{ and}$$

$$N_{PRB} = 10 \times \max\left\{\left\lfloor N'_{PRB} \times \frac{0.125}{10} \right\rfloor, 1\right\},$$

or a mathematically equivalent formula to arrive only at multiples of 10, instead of the former scaling by 0.5 and 0.125, respectively.

In a sixth embodiment, one or more of entries indicated by a Modulation and Coding Scheme (MCS) indicator in a DCI can be used to indicate whether and/or how scaling should be applied when determining the TBS size. In a first variant of the sixth embodiment, MCS index 30 and/or MCS index 31 can indicate that the transport block size is determined from the DCI that has been received for the initial transmission, such as the first transmission, of the transport block of the same HARQ process. According to a possible implementation, this can further be conditioned on the NDI indicating a retransmission of the transport block and not a new transport block transmission. According to this implementation, the modulation scheme for the retransmission can be identical to the modulation level that has been indicated for the first transmission of the transport block of the same HARQ process.

In a second variant of the sixth embodiment, MCS indices 30 and 31 can be used to indicate the TBS determination in the same way as for the first variant of the sixth embodiment. However, MCS indices 30 and 31 can indicate different modulation levels that are to be applied. For example, one of MCS index 30 or 31 can indicate to use the same modulation level that has been indicated for the first transmission of the transport block of the same HARQ process, and the other of MCS index 30 or 31 can indicate to use the next lower modulation level available compared to the one that has been indicated for the first transmission of the transport block of the same HARQ process. In the context of LTE, there can be so far a choice of modulation levels 2, 4, 6, 8, or a subset thereof. For example, if the modulation level for the first transmission of a transport block indicates the use of modulation level 6, then an indication of MCS index 31 can indicate the use of modulation level 4 for the retransmission, since this is the next lower available modulation level. If the first transmission already indicated the lowest available modulation level, then no further reduction of modulation levels may be used, so that any retransmission indicated by MCS index 30 or 31 would also apply the lowest modulation level. Using one of the two MCS indices to indicate a lower modulation level can be based on the fact that a retransmission is usually necessary because the first transmission failed due to errors that could not be corrected by the error correction coding. This can be indicative that the code rate had not been sufficient. In other words, the signal to noise ratio may not have been sufficiently high to facilitate a correct decoding of the transport block. Therefore, a more robust transmission method can be used for a retransmission, which can be facilitated by using a smaller modulation level than for the previous transmission, if available.

In a third variant of the sixth embodiment, one or more MCS indices can be used to indicate the TBS determination in the same way as for the first/second variant of the sixth embodiment. In addition, in the third variant, the MCS index can indicate the modulation level to be used for a retransmission. In contrast to the second variant of the sixth embodiment, the MCS index according to this variant can directly indicate the modulation level instead of a relative relation to the modulation level of the first transmission of the transport block. For example, a first MCS index can indicate the use of a first modulation level for the retransmission, a second MCS index can indicate the use of a second modulation level for the retransmission, and so forth. As a further example, a UE that is configured to use modulation levels up to 6, such as 64-QAM, MCS index 29 can indicate the use of modulation level 2, such as Quadrature Phase Shift Keying (QPSK), MCS index 30 can indicate the use of modulation level 4, such as 16-Quadrature Amplitude Modulation (QAM), and MCS index 31 can indicate the use of modulation level 6, such as 64-QAM. If a UE is configured to use modulation levels up to 8, such as 256-QAM, MCS index 29 can indicate the use of modulation level 4, such as 16-QAM, MCS index 30 can indicate the use of modulation level 6, such as 64-QAM, and MCS index 31 can indicate the use of modulation level 8, such as 256-QAM. In case one or more of those MCS indices are used to indicate other information, such as a disabled transport block or no transport block transmission for transmission of control information feedback only, an additional condition can be included based on another field indicated in the DCI to determine the interpretation. For example, indicating MCS index 29 together with Redundancy Version 0 in the DCI can be interpreted as indicating a disabled transport block in case of DCI format 4A/4B or a modulation level 2 without a transport block transmission implying transmission of only control information feedback. Indicating MCS index 29 together with another Redundancy Version can be interpreted as indicating a retransmission with determining the TBS from the DCI scheduling the initial transmission of the transport block of the same HARQ process with a modulation level of 2 or 4 as given in the previous example, respectively.

Figure 2:
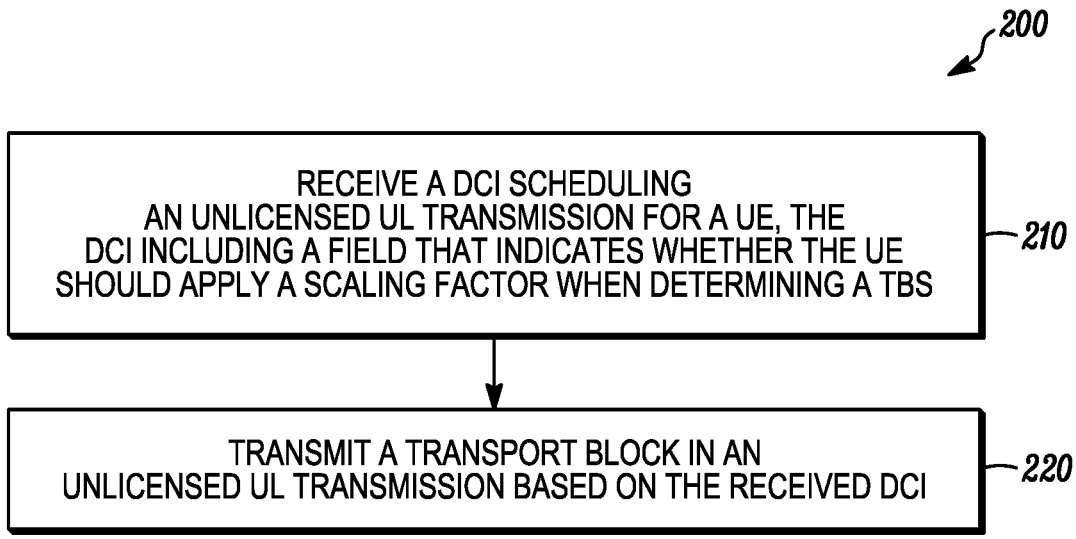
FIG. 2 is an example flowchart illustrating the operation of an apparatus according to a possible embodiment.

FIG. 2 is an example flowchart 200 illustrating the operation of a wireless communication device, such as the UE 110, according to a possible embodiment. At 210, DCI can be received on a control channel. The DCI can schedule an unlicensed UL transmission for a UE. The DCI can include a field that indicates whether the UE should apply a scaling factor when determining a TBS. The field in the DCI can also indicate a value of the scaling factor to be applied.

According to a possible embodiment, the field in the DCI can be an MCS field. A value in the MCS field in the DCI can indicate whether the scaling factor should be applied when determining the TBS. According to a possible implementation, a value of 30 in the MCS field in the DCI can indicate whether the scaling factor should be applied. According to another possible implementation, a value of 30 in the MCS field in the DCI can indicate a same scaling factor should be applied for a retransmission of the transport block as a scaling factor applied for an earlier transmission of the transport block. According to a further possible implementation, MCS index 30 can indicate that the TBS is determined from the DCI that has been received for the initial transmission. Other fields and other values can indicate other scaling factor information and other information.

According to another possible embodiment, the DCI can include the field that indicates whether the UE should apply a scaling factor when determining a TBS based on the UE being configured to transmit using partial UL subframe Mode 2, partial UL subframe Mode 3, and/or any other partial UL subframe mode.

According to a possible embodiment, the scaling factor can be applied for the TBS determination for a retransmission of the transport block if and only if scaling is applied for the TBS determination for an earlier transmission of the transport block. The scaling factor may not be applied for the TBS determination for a retransmission of the transport block if and only if scaling is not applied for the TBS determination for an earlier transmission of the transport block.

According to a possible embodiment a scaling factor can be applied according to a partial DL subframe length if the subframe is used to transmit a first transmission of the transport block. For example, the scaling factor can be applied during the TBS determination of the transport block. The scaling factor that was used for the first transmission of the transport block can be applied to determine a TBS of a retransmission of the transport block.

At 220, a transport block can be transmitted in the unlicensed UL transmission based on the received DCI. For example, a UE can transmit the transport block using partial UL subframe Mode 2, partial UL subframe Mode 3, or other transmission mode. According to a possible embodiment, the TBS can be determined based on the field that indicates whether the scaling factor should be applied and the transport block can be transmitted in an unlicensed UL transmission based on the received DCI and based on the determined TBS.

Figure 3:
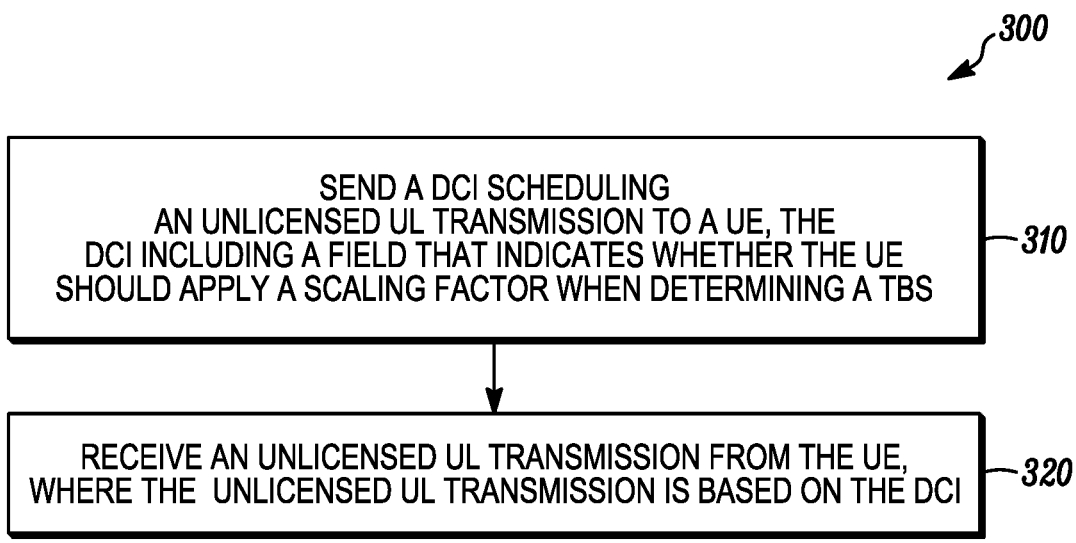
FIG. 3 is an example flowchart illustrating the operation of an apparatus according to a possible embodiment.

FIG. 3 is an example flowchart 300 illustrating the operation of a wireless communication device, such as the network entity 120, according to a possible embodiment. At 310, DCI can be sent on a control channel. The DCI can schedule an unlicensed UL transmission to a UE. The DCI can include a field that indicates whether the UE should apply a scaling factor when determining a Transport Block Size TBS.

According to a possible embodiment, the field included in the DCI can be an MCS field. A value in the MCS field in the DCI can indicate whether the scaling factor should be applied when determining the TBS. For example, a value of 30 in the MCS field in the DCI can indicate whether the scaling factor should be applied. As another example, a value of 30 in the MCS field in the DCI can indicate a same scaling factor should be applied for a retransmission of the transport block as a scaling factor for an earlier transmission of the transport block. Other fields and other values can indicate other scaling factor information.

According to a possible embodiment it can be determined if a UE is configured to transmit using partial UL subframe Mode 2 and/or Mode 3 partial UL subframe. The DCI scheduling an unlicensed UL transmission can include the field that indicates whether the UE should apply the scaling factor when determining the TBS based on UE being allowed to transmit using partial UL subframe Mode 2 and/or partial UL subframe Mode 3.

At 320, the unlicensed UL transmission can be received from the UE. The unlicensed UL transmission can be based on the DCI. According to a possible embodiment, the received unlicensed UL transmission can be based on a TBS determined based on the DCI field that indicates whether the UE should apply the scaling factor when determining the TBS. According to another possible embodiment, the received unlicensed UL transmission can be based on a scaling value according to a partial DL subframe length if the received unlicensed UL transmission is a first transmission of a transport block. According to another possible embodiment, the received unlicensed UL transmission can be a retransmission of the transport block based on a scaling factor that was used for a first transmission of the transport block to determine a TBS of the retransmission of the transport block.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 4:
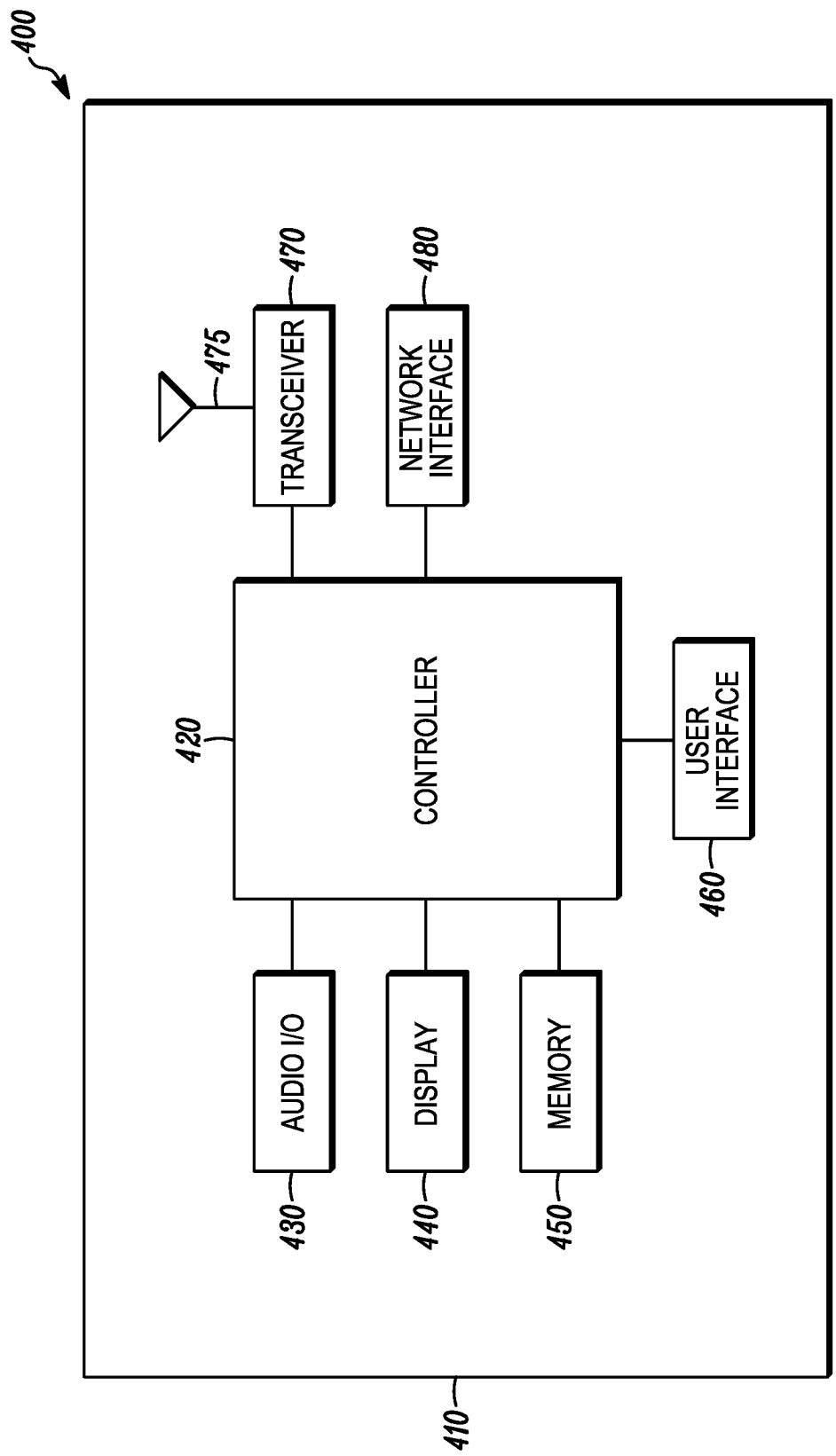
FIG. 4 is an example block diagram of an apparatus according to a possible embodiment.

FIG. 4 is an example block diagram of an apparatus 400, such as the UE 110, the network entity 120, or any other wireless communication device, according to a possible embodiment. The apparatus 400 can include a housing 410, a controller 420 coupled to the housing 410, audio input and output circuitry 430 coupled to the controller 420, a display 440 coupled to the controller 420, at least one transceiver 470 coupled to the controller 420, at least one antenna 475 coupled to the transceiver 470, a user interface 460 coupled to the controller 420, a memory 450 coupled to the controller 420, and a network interface 480 coupled to the controller 420. The apparatus 400 may not necessarily include all of the illustrated elements for different embodiments of the present disclosure. The apparatus 400 can perform the methods described in all the embodiments.

The display 440 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 470 can be one or more transceivers that can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 450 can include a Random Access Memory (RAM), a Read Only Memory (RON), an optical memory, a solid state memory, a flash memory, a removable memory, a hard drive, a cache, or any other memory that can be coupled to an apparatus.

The apparatus 400 or the controller 420 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 450 or elsewhere on the apparatus 400. The apparatus 400 or the controller 420 may also use hardware to implement disclosed operations. For example, the controller 420 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an apparatus and implementing the disclosed embodiments. Some or all of the additional elements of the apparatus 400 can also perform some or all of the operations of the disclosed embodiments.

In operation, the apparatus 400 can perform the methods and operations of the disclosed embodiments. The transceiver 470 can transmit and receive signals, including control signals and data signals and including information, such as control and data information. The controller 420 can generate and process the transmitted and received signals and information.

According to a possible embodiment, the controller 420 can control operations of the apparatus. The transceiver 470 can receive DCI on a control channel. The DCI can schedule an unlicensed UL transmission for the apparatus 400. The DCI can include a field that indicates whether apparatus 400 should apply a scaling factor when determining a TBS.

According to a possible embodiment, the field in the DCI can be an MCS field and a value in the MCS field in the DCI can indicate whether the scaling factor should be applied when determining the TBS. According to a possible implementation, a value of 30 in the MCS field in the DCI can indicate whether the scaling factor should be applied. According to another possible implementation, a value of 30 in the MCS field in the DCI can indicate a same scaling factor should be applied for a retransmission of the transport block as a scaling factor for an earlier transmission of the transport block. According to a possible embodiment, the DCI can include the field that indicates whether the apparatus should apply a scaling factor when determining a TBS based on UE being configured to transmit using partial UL subframe Mode 2, partial UL subframe Mode 3, or other UL transmission mode.

According to a possible embodiment, the controller 420 can apply the scaling factor for the TBS determination for a retransmission of the transport block if and only if scaling is applied for the TBS determination for an earlier transmission of the transport block. According to a related implementation, the controller 420 may not apply the scaling factor for the TBS determination for a retransmission of the transport block if and only if scaling is not applied for the TBS determination for an earlier transmission of the transport block.

According to a possible embodiment, the controller 420 can apply a scaling factor according to a partial DL subframe length if the subframe is used to transmit a first transmission of the transport block. According to a possible implementation, the controller can apply the scaling factor that was used for the first transmission of the transport block to determine a TBS of a retransmission of the transport block.

The transceiver 470 can transmit a transport block in the unlicensed UL transmission based on the received DCI. According to a possible embodiment, the controller 420 can determine the TBS based on the field that indicates whether the scaling factor should be applied and the transceiver 470 can transmit the transport block in an unlicensed UL transmission based on the received DCI and based on the determined TBS.

According to another possible embodiment in operation as a network entity, such as the network entity 120, the controller 420 can generate DCI. The DCI can schedule an unlicensed UL transmission to a UE. The DCI can include a field that indicates whether the UE should apply a scaling factor when determining a TBS. The transceiver 470 can send the DCI on a control channel. The transceiver 470 can receive the unlicensed UL transmission from the UE. The unlicensed UL transmission can be based on the DCI.

The following information can show the loss of TBS flexibility according to the scaling usage without the disclosed embodiments, exemplarily for the case of single-layer Physical Uplink Shared Channel (PUSCH) transmission.

For a transmission of a transport block according to partial UL subframe Mode 0/1, for the number of assigned resource blocks as {10; 20; 30; 40; 50; 60; 80; 90; 100}, the following 126 TBSs can be obtained assuming a single-layer transmission for the PUSCH:

256, 344, 424, 536, 568, 696, 712, 808, 872, 1032, 1064, 1096, 1160, 1224, 1320, 1384, 1416, 1544, 1672, 1736, 1800, 2024, 2088, 2152, 2216, 2280, 2344, 2472, 2536, 2664, 2792, 2856, 3112, 3240, 3624, 4008, 4136, 4264, 4392, 4584, 4776, 4968, 5160, 5352, 5544, 5736, 5992, 6200, 6456, 6712, 6968, 7224, 7480, 7736, 7992, 8248, 8504, 8760, 9144, 9528, 9912, 10296, 10680, 11064, 11448, 11832, 12216, 12576, 12960, 13536, 14112, 14688, 15264, 15840, 16416, 16992, 17568, 18336, 19080, 19848, 20616, 21384, 22152, 22920, 23688, 24496, 25456, 26416, 27376, 28336, 29296, 30576, 31704, 32856, 34008, 35160, 36696, 37888, 39232, 40576, 42368, 43816, 45352, 46888, 48936, 51024, 52752, 55056, 57336, 59256, 61664, 63776, 66592, 68808, 71112, 73712, 75376, 76208, 78704, 81176, 84760, 87936, 93800, 97896, 100752, 105528.

For a transmission of a transport block according to partial UL subframe Mode 2/3 with a scaling factor of 0.5, for the number of assigned resource blocks as {10; 20; 30; 40; 50; 60; 80; 90; 100}, the following 127 TBSs can be obtained assuming a single-layer transmission for the PUSCH:

120, 176, 208, 256, 328, 344, 392, 424, 504, 520, 536, 568, 584, 648, 680, 696, 712, 776, 808, 872, 904, 1000, 1032, 1064, 1096, 1128, 1160, 1224, 1256, 1320, 1384, 1416, 1544, 1608, 1736, 1800, 1992, 2024, 2088, 2152, 2216, 2280, 2344, 2472, 2536, 2600, 2664, 2792, 2856, 2984, 3112, 3240, 3368, 3496, 3624, 3752, 3880, 4008, 4136, 4264, 4392, 4584, 4776, 4968, 5160, 5352, 5544, 5736, 5992, 6200, 6456, 6712, 6968, 7224, 7480, 7736, 7992, 8248, 8504, 8760, 9144, 9528, 9912, 10296, 10680, 11064, 11448, 11832, 12216, 12576, 12960, 13536, 14112, 14688, 15264, 15840, 16416, 16992, 17568, 18336, 19080, 19848, 20616, 21384, 22152, 22920, 23688, 24496, 25456, 26416, 27376, 28336, 29296, 30576, 31704, 32856, 34008, 35160, 36696, 37888, 39232, 40576, 42368, 43816, 4688, 48936, 52752.

For a transmission of a transport block according to partial UL subframe Mode 3 with a scaling factor of 0.125, for the number of assigned resource blocks as {10; 20; 30; 40; 50; 60; 80; 90; 100}, the following 124 TBSs can be obtained assuming a single-layer transmission for the PUSCH:

16, 24, 32, 40, 56, 72, 88, 104, 120, 136, 144, 176, 208, 224, 256, 280, 288, 296, 328, 336, 344, 376, 392, 408, 424, 440, 456, 472, 488, 504, 520, 552, 568, 584, 600, 616, 632, 648, 680, 696, 712, 744, 776, 808, 840, 872, 904, 968, 1000, 1032, 1064, 1096, 1128, 1160, 1192, 1224, 1256, 1288, 1320, 1384, 1416, 1480, 1544, 1608, 1672, 1736, 1800, 1864, 1928, 1992, 2024, 2088, 2152, 2216, 2280, 2344, 2408, 2472, 2536, 2600, 2664, 2728, 2792, 2856, 2984, 3112, 3240, 3368, 3496, 3624, 3752, 3880, 4008, 4136, 4264, 4392, 4584, 4776, 4968, 5160, 5352, 5544, 5736, 5992, 6200, 6456, 6712, 6968, 7224, 7480, 7736, 7992, 8248, 8504, 8760, 9144, 9528, 9912, 10296, 10680, 11064, 11448, 11832, 12576.

For the case of a transport block generated for a subframe without scaling, such as partial UL subframe Mode 0/1, only the following 104 TBS can be used if the retransmission should be scheduled in a subframe employing partial UL subframe Mode 2/3 with a scaling factor 0.5 and vice versa:

256, 344, 424, 536, 568, 696, 712, 808, 872, 1032, 1064, 1096, 1160, 1224, 1320, 1384, 1416, 1544, 1736, 1800, 2024, 2088, 2152, 2216, 2280, 2344, 2472, 2536, 2664, 2792, 2856, 3112, 3240, 3624, 4008, 4136, 4264, 4392, 4584, 4776, 4968, 5160, 5352, 5544, 5736, 5992, 6200, 6456, 6712, 6968, 7224, 7480, 7736, 7992, 8248, 8504, 8760, 9144, 9528, 9912, 10296, 10680, 11064, 11448, 11832, 12216, 12576, 12960, 13536, 14112, 14688, 15264, 15840, 16416, 16992, 17568, 18336, 19080, 19848, 20616, 21384, 22152, 22920, 23688, 24496, 25456, 26416, 27376, 28336, 29296, 30576, 31704, 32856, 34008, 35160, 36696, 37888, 39232, 40576, 42368, 43816, 46888, 48936, 52752.

For the case of a transport block generated for a subframe without scaling, such as partial UL subframe Mode 0/1, only the following 66 TBS can be used if the retransmission should be scheduled in a subframe employing partial UL subframe Mode 3 with a scaling factor 0.125 and vice versa:

256, 344, 424, 568, 696, 712, 808, 872, 1032, 1064, 1096, 1160, 1224, 1320, 1384, 1416, 1544, 1672, 1736, 1800, 2024, 2088, 2152, 2216, 2280, 2344, 2472, 2536, 2664, 2792, 2856, 3112, 3240, 3624, 4008, 4136, 4264, 4392, 4584, 4776, 4968, 5160, 5352, 5544, 5736, 5992, 6200, 6456, 6712, 6968, 7224, 7480, 7736, 7992, 8248, 8504, 8760, 9144, 9528, 9912, 10296, 10680, 11064, 11448, 11832, 12576.

For the case of a transport block generated for a subframe employing partial UL subframe Mode 2/3 with a scaling factor 0.5, only the following 88 TBS can be used if the retransmission should be scheduled in a subframe employing partial UL subframe Mode 3 with a scaling factor 0.125 and vice versa:

120, 176, 208, 256, 328, 344, 392, 424, 504, 520, 568, 584, 648, 68, 696, 712, 776, 808, 872, 904, 1000, 1032, 1064, 1096, 1128, 1160, 1224, 1256, 1320, 1384, 1416, 1544, 1608, 1736, 1800, 1992, 2024, 2088, 2152, 2216, 2280, 2344, 2472, 2536, 2600, 2664, 2792, 2856, 2984, 3112, 3240, 3368, 3496, 3624, 3752, 3880, 4008, 4136, 4264, 4392, 4584, 4776, 4968, 5160, 5352, 5544, 5736, 5992, 6200, 6456, 6712, 6968, 7224, 7480, 7736, 7992, 8248, 8504, 8760, 9144, 9528, 9912, 10296, 10680, 11064, 11448, 11832, 12576.

Generally, a substantial number of TBSs may not be available for retransmissions in a subframe using a different partial UL subframe Mode/scaling. This can imply that either a corresponding subframe may not be used for retransmissions, which can imply latency deteriorates, or that the corresponding TBS should not have been used for a first generation/transmission of the transport block, which can imply limitations to the scheduler and/or link adaptation granularity of the transmission. Additionally, the unavailable TBSs can be those with very large values, such as where the spectral efficiency for a transmission is high. Those TBSs may be used for high data rate transmissions on the medium.

Figure 5:
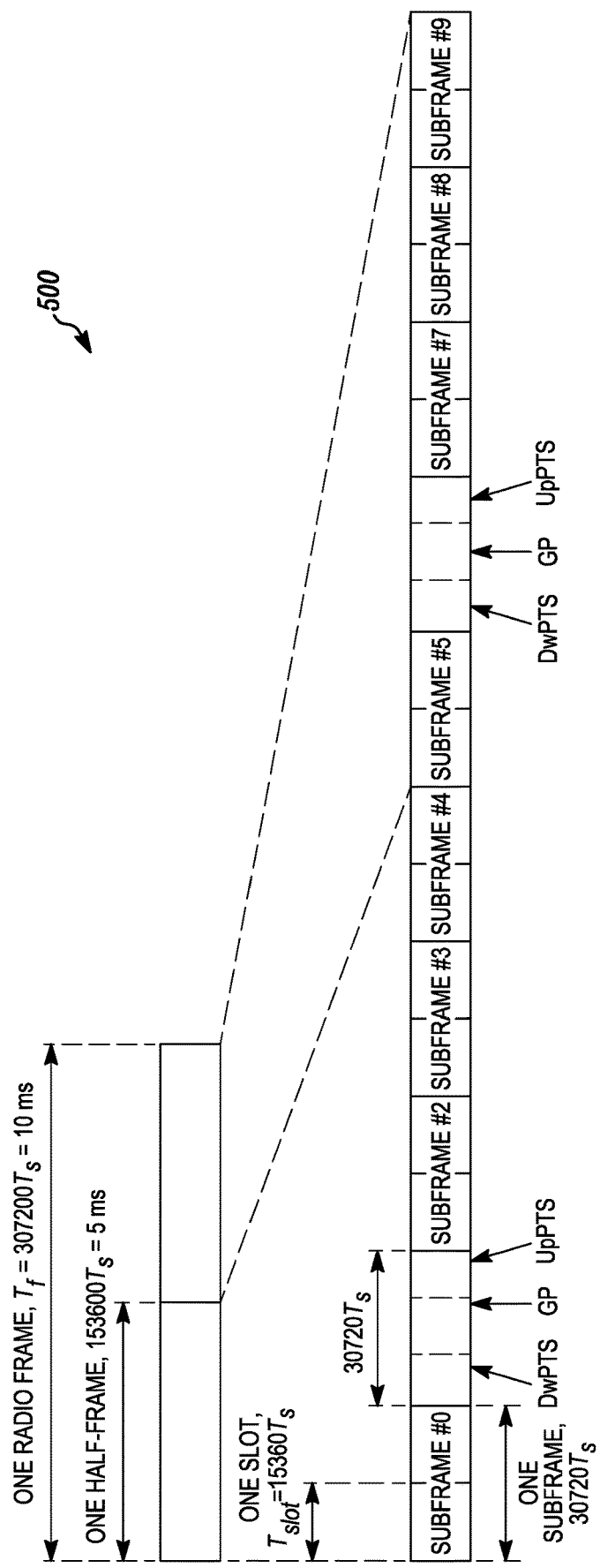
FIG. 5 is an example illustration of frame structure 2.
Figure 6:
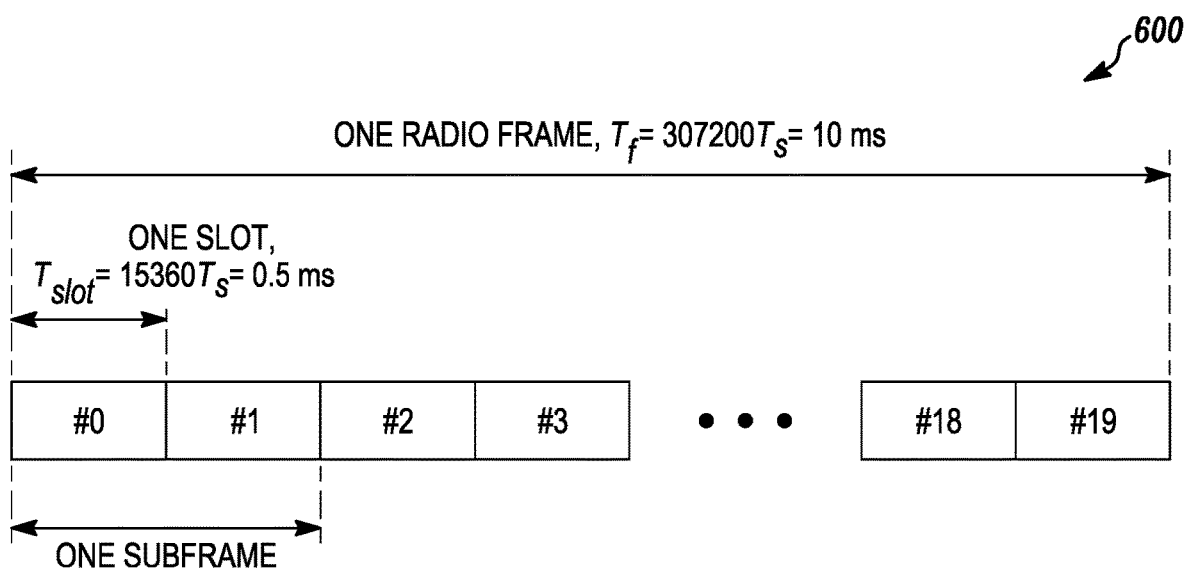
FIG. 6 is an example illustration of frame structure 3.

FIG. 5 is an example illustration 500 of frame structure 2.
FIG. 6 is an example illustration 600 of frame structure 3.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a user equipment, the method comprising:
    receiving downlink control information on a control channel, the downlink control information scheduling an unlicensed uplink transmission for the user equipment, the downlink control information including a field that indicates whether the user equipment should apply a scaling factor when determining a transport block size; and
    transmitting a transport block in the unlicensed uplink transmission based on the received downlink control information,
    wherein the field in the downlink control information comprises a modulation and coding scheme field,
    wherein a value in the modulation and coding scheme field in the downlink control information indicates whether the scaling factor should be applied when determining the transport block size, and
    wherein a value of 30 in the modulation and coding scheme field in the downlink control information indicates whether the scaling factor should be applied.

2. The method according to claim 1, wherein a value of 30 in the modulation and coding scheme field in the downlink control information indicates a same scaling factor should be applied for a retransmission of the transport block as a scaling factor for an earlier transmission of the transport block.

3. The method according to claim 1, wherein the downlink control information includes the field that indicates whether the user equipment should apply a scaling factor when determining a transport block size based on the user equipment being configured to transmit using at least one selected from partial uplink subframe Mode 2 and partial uplink subframe Mode 3.

4. The method according to claim 1, further comprising:
    applying the scaling factor for the transport block size determination for a retransmission of the transport block if and only if scaling is applied for the transport block size determination for an earlier transmission of the transport block; and
    not applying the scaling factor for the transport block size determination for a retransmission of the transport block if and only if scaling is not applied for the transport block size determination for an earlier transmission of the transport block.

5. The method according to claim 1, further comprising determining the transport block size based on the field that indicates whether the scaling factor should be applied,
wherein transmitting comprises transmitting the transport block in an unlicensed uplink transmission based on the received downlink control information and based on the determined transport block size.

6. The method according to claim 1, further comprising applying a scaling factor according to a partial uplink subframe length if the subframe is used to transmit a first transmission of the transport block.

7. The method according to claim 6, further comprising, applying the scaling factor that was used for the first transmission of the transport block to determine a transport block size of a retransmission of the transport block.

8. An apparatus comprising:
a controller that controls operations of the apparatus; and
a transceiver coupled to the controller, where the transceiver
receives downlink control information on a control channel, the downlink control information scheduling an unlicensed uplink transmission for the apparatus, the downlink control information including a field that indicates whether the apparatus should apply a scaling factor when determining a transport block size, and
transmits a transport block in the unlicensed uplink transmission based on the received downlink control information,
wherein the field in the downlink control information comprises a modulation and coding scheme field,
wherein a value in the modulation and coding scheme field in the downlink control information indicates whether the scaling factor should be applied when determining the transport block size, and
wherein a value of 30 in the modulation and coding scheme field in the downlink control information indicates whether the scaling factor should be applied.

9. The apparatus according to claim 8, wherein a value of 30 in the modulation and coding scheme field in the downlink control information indicates a same scaling factor should be applied for a retransmission of the transport block as a scaling factor for an earlier transmission of the transport block.

10. The apparatus according to claim 8, wherein the downlink control information includes the field that indicates whether the apparatus should apply a scaling factor when determining a transport block size based on the apparatus being configured to transmit using at least one selected from partial uplink subframe Mode 2 and partial uplink subframe Mode 3.

11. The apparatus according to claim 8, wherein the controller
applies the scaling factor for the transport block size determination for a retransmission of the transport block if and only if scaling is applied for the transport block size determination for an earlier transmission of the transport block, and
does not apply the scaling factor for the transport block size determination for a retransmission of the transport block if and only if scaling is not applied for the transport block size determination for an earlier transmission of the transport block.

12. The apparatus according to claim 8,
wherein the controller determines the transport block size based on the field that indicates whether the scaling factor should be applied, and
wherein the transceiver transmits the transport block in an unlicensed uplink transmission based on the received downlink control information and based on the determined transport block size.

13. The apparatus according to claim 8, wherein the controller applies a scaling factor according to a partial uplink subframe length if the subframe is used to transmit a first transmission of the transport block.

14. The apparatus according to claim 13, wherein the controller applies the scaling factor that was used for the first transmission of the transport block to determine a transport block size of a retransmission of the transport block.

15. A method in a user equipment, the method comprising:
receiving downlink control information on a control channel, the downlink control information scheduling an unlicensed uplink transmission for the user equipment, the downlink control information including a field that indicates whether the user equipment should apply a scaling factor when determining a transport block size;
determining a transport block size of a transport block based on the field that indicates whether the user equipment should apply the scaling factor; and
transmitting a transport block in the unlicensed uplink transmission based on the received downlink control information,
wherein a value in the field in the downlink control information indicates a same scaling factor should be applied for a retransmission of the transport block as a scaling factor for an earlier transmission of the transport block.

* * * * *